United States Patent
Städler et al.

(10) Patent No.: US 9,803,789 B2
(45) Date of Patent: Oct. 31, 2017

(54) COUPLING FORMATION OF A PIPETTING CHANNEL OF A PIPETTING DEVICE FOR COUPLING OF A PIPETTE TIP THERETO

(71) Applicant: HAMILTON BONADUZ AG, Bonaduz (CH)

(72) Inventors: Andreas Städler, Felsberg (CH); Torsten Peetz, Chur (CH)

(73) Assignee: HAMILTON BONADUZ AG, Bonaduz (CH)

( * ) Notice: Subject to any disclaimer, the term of this patent is extended or adjusted under 35 U.S.C. 154(b) by 233 days.

(21) Appl. No.: 14/417,336

(22) PCT Filed: Jul. 23, 2013

(86) PCT No.: PCT/EP2013/065485
§ 371 (c)(1),
(2) Date: Jan. 26, 2015

(87) PCT Pub. No.: WO2014/016282
PCT Pub. Date: Jan. 30, 2014

(65) Prior Publication Data
US 2015/0276107 A1    Oct. 1, 2015

(30) Foreign Application Priority Data
Jul. 25, 2012    (DE) .......................... 10 2012 213 089

(51) Int. Cl.
  *F16L 39/00*    (2006.01)
  *F16L 37/086*   (2006.01)
  (Continued)

(52) U.S. Cl.
  CPC ............. *F16L 37/086* (2013.01); *B01L 3/021* (2013.01); *B01L 3/0224* (2013.01);
  (Continued)

(58) Field of Classification Search
  USPC .......................... 285/305, 319, 921; 422/931
  See application file for complete search history.

(56) References Cited

U.S. PATENT DOCUMENTS 3,160,457 A * 12/1964 Fischer .............. H01R 13/6277
                                                              285/319
3,639,890 A *  2/1972 Stevens .............. H01R 13/6277
                                                              285/319
(Continued)

FOREIGN PATENT DOCUMENTS

DE    102010001229 A1    7/2011
EP        0656229 A1     6/1995
(Continued)

OTHER PUBLICATIONS

Written Opinion issued for International patent application No. PCT/EP2013/065485 dated Jan. 25, 2015, 8 pages.
(Continued)

*Primary Examiner* — Aaron Dunwoody
(74) *Attorney, Agent, or Firm* — Rothwell, Figg, Ernst & Manbeck, P.C.

(57) ABSTRACT

The present invention relates to a coupling formation of a pipetting channel of a pipetting device for coupling of an implement, for instance a pipette tip, or a laboratory instrument, laboratory tool or the like, thereto, wherein the coupling formation surrounds a pipetting channel section which extends along a pipetting channel axis which defines an axial direction, wherein the coupling formation additionally has, at its free longitudinal end, a pressure-imparting orifice into which the pipetting channel section opens and has, at its radially outer surface which surrounds the pipetting channel axis and extends principally in axial direction and in peripheral direction about the pipetting channel axis relative to the pipetting channel axis, a coupling projection which yields in the radial direction, which is characterized in that the
(Continued)

coupling projection is provided so as to be essentially undeformable but radially movable on a spring arrangement which is elastic in radial direction.

19 Claims, 6 Drawing Sheets

(51) Int. Cl.
*B01L 3/02* (2006.01)
*F16L 21/035* (2006.01)
*F16L 21/08* (2006.01)

(52) U.S. Cl.
CPC ........... *B01L 3/0279* (2013.01); *F16L 21/035* (2013.01); *F16L 21/08* (2013.01); *B01L 2200/023* (2013.01); *F16L 2201/44* (2013.01)

(56) References Cited

U.S. PATENT DOCUMENTS

| | | | | |
|---|---|---|---|---|
| 3,908,925 | A * | 9/1975 | Rinkleib | G11B 15/66 242/899 |
| 3,912,009 | A * | 10/1975 | Davis, Jr. | E21B 23/02 166/240 |
| 4,111,530 | A * | 9/1978 | Fuehrer | G02B 21/02 285/321 |
| 4,616,514 | A | 10/1986 | Magnussen, Jr. et al. | |
| 4,860,838 | A * | 8/1989 | Asak | E21B 10/64 175/320 |
| 5,251,938 | A * | 10/1993 | Erickson | F16L 37/084 285/121.6 |
| 5,395,139 | A * | 3/1995 | Morrisson | F16L 37/098 285/122.1 |
| 5,620,660 | A | 4/1997 | Belgardt et al. | |
| 5,718,463 | A * | 2/1998 | Hollnagel | F16L 37/084 285/319 |
| 5,803,512 | A * | 9/1998 | Hollnagel | F16L 35/00 285/319 |
| 6,290,525 | B1 * | 9/2001 | Jacobi | H01R 13/639 439/310 |
| 6,655,491 | B1 * | 12/2003 | Stoll | B62D 5/062 180/417 |
| 7,033,543 | B1 | 4/2006 | Panzer et al. | |
| 7,240,927 | B2 * | 7/2007 | Chang | F16L 37/091 285/243 |
| 7,249,788 | B2 * | 7/2007 | Muhammad | F16L 37/092 285/243 |
| 7,249,789 | B2 * | 7/2007 | Haney | E21B 17/046 138/109 |
| 8,075,551 | B2 * | 12/2011 | Eberle | A61B 17/00 285/88 |
| 2003/0102667 | A1 * | 6/2003 | Weller | F16L 37/133 285/319 |
| 2004/0080160 | A1 * | 4/2004 | Rief | E04H 4/1654 285/276 |
| 2005/0204832 | A1 | 9/2005 | Jessop | |
| 2010/0196210 | A1 | 8/2010 | Jungheim et al. | |
| 2011/0206577 | A1 | 8/2011 | Leckebusch | |

FOREIGN PATENT DOCUMENTS

| | | |
|---|---|---|
| EP | 1862219 A1 | 12/2007 |
| EP | 2311566 A1 | 4/2011 |
| EP | 2452754 A2 | 5/2012 |
| JP | H01-132237 U | 9/1989 |
| JP | 2002-542017 A | 12/2002 |
| JP | 2005062149 A | 3/2005 |
| JP | 2005224906 A | 8/2005 |
| JP | 2007-521956 A | 8/2007 |
| JP | 2012-507666 A | 3/2012 |
| WO | 2005082536 A1 | 9/2005 |

OTHER PUBLICATIONS

Office Action issued for Japanese Patent Application No. 2015-523524 dated May 8, 2017 (4 pages).
Search Report issued for PCT application No. PCT/EP2013/065485 dated Nov. 19, 2013, 3 pages.
Search Report issued tor German patent application No. 102012213089.6 dated Apr. 15, 2013, with machine English translation, 8 pages.

* cited by examiner

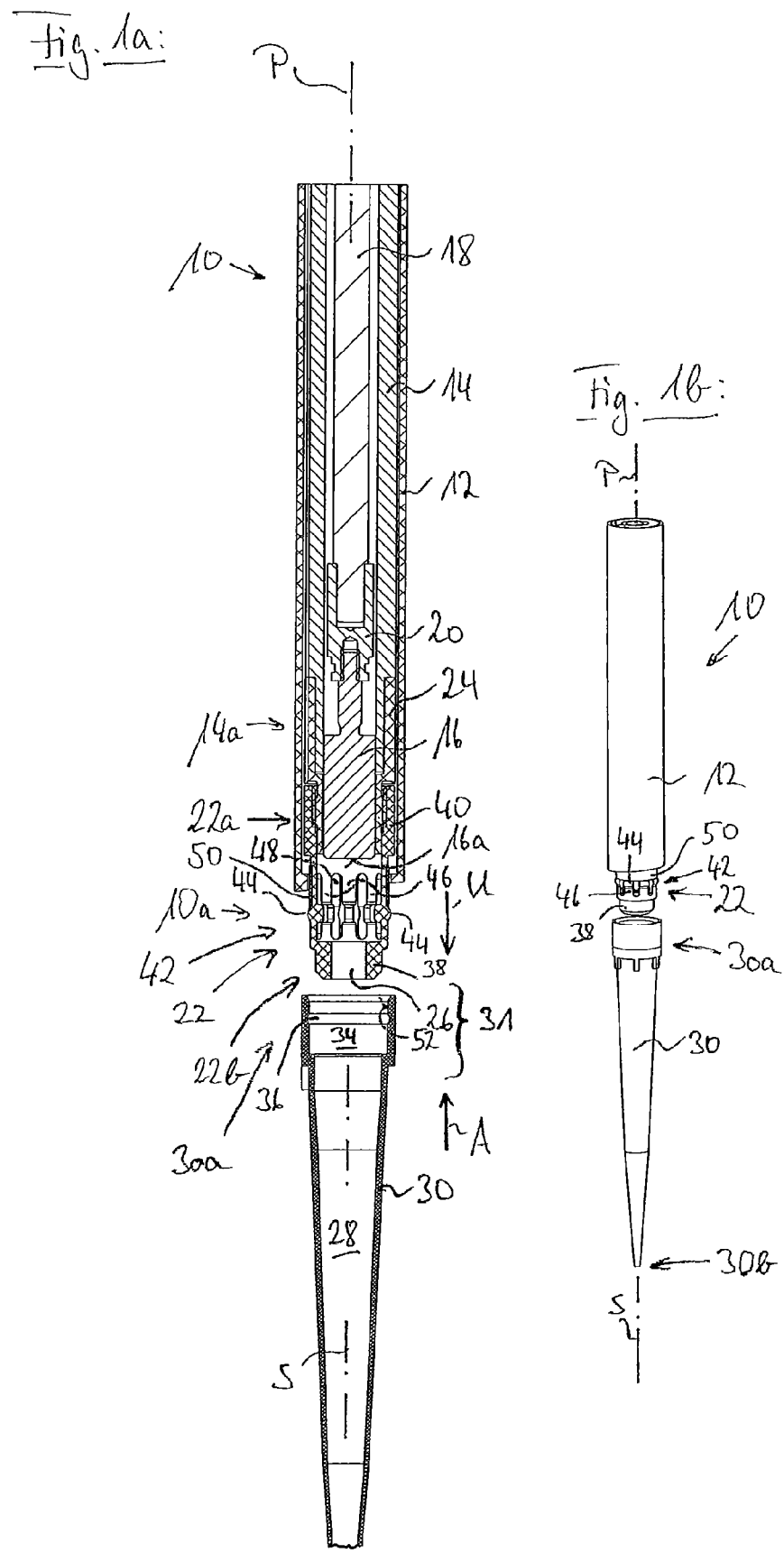

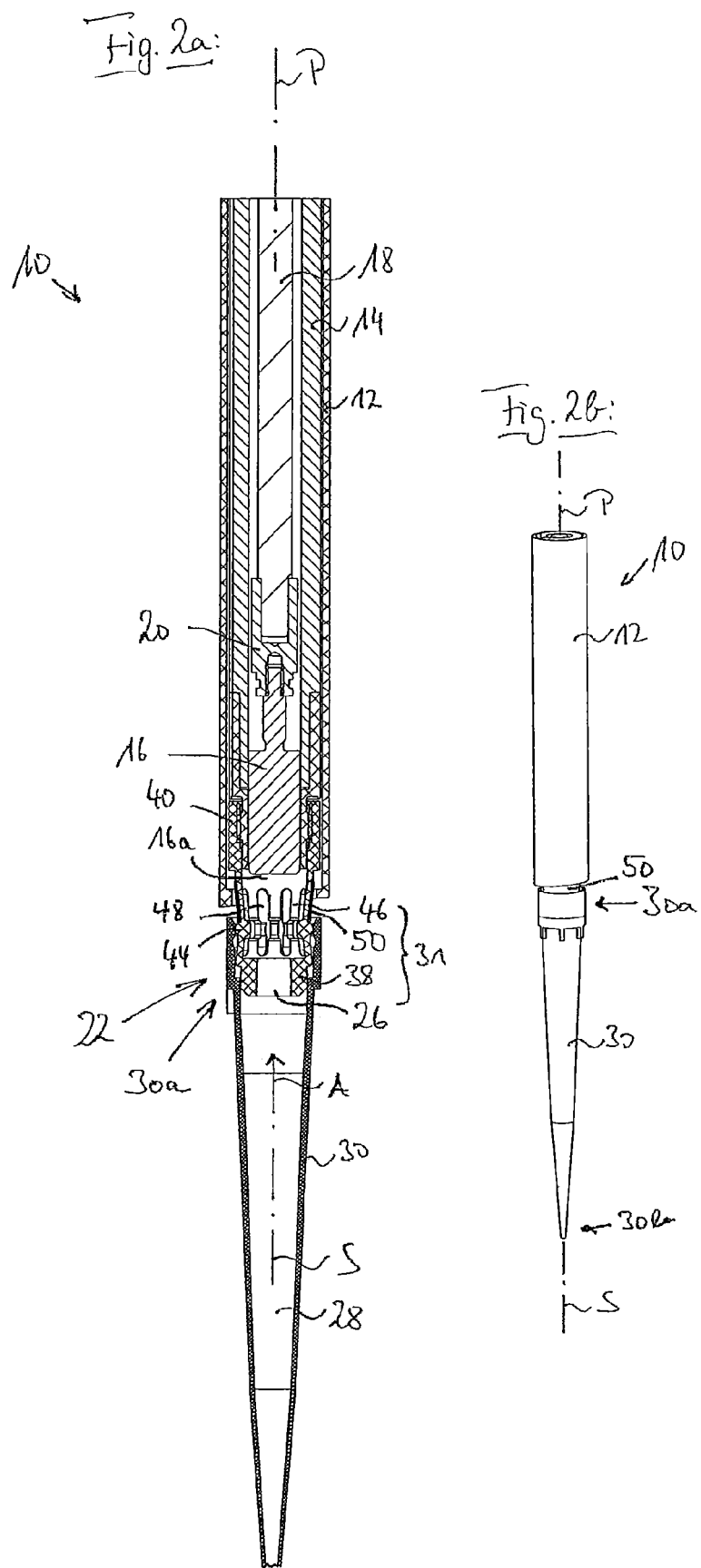

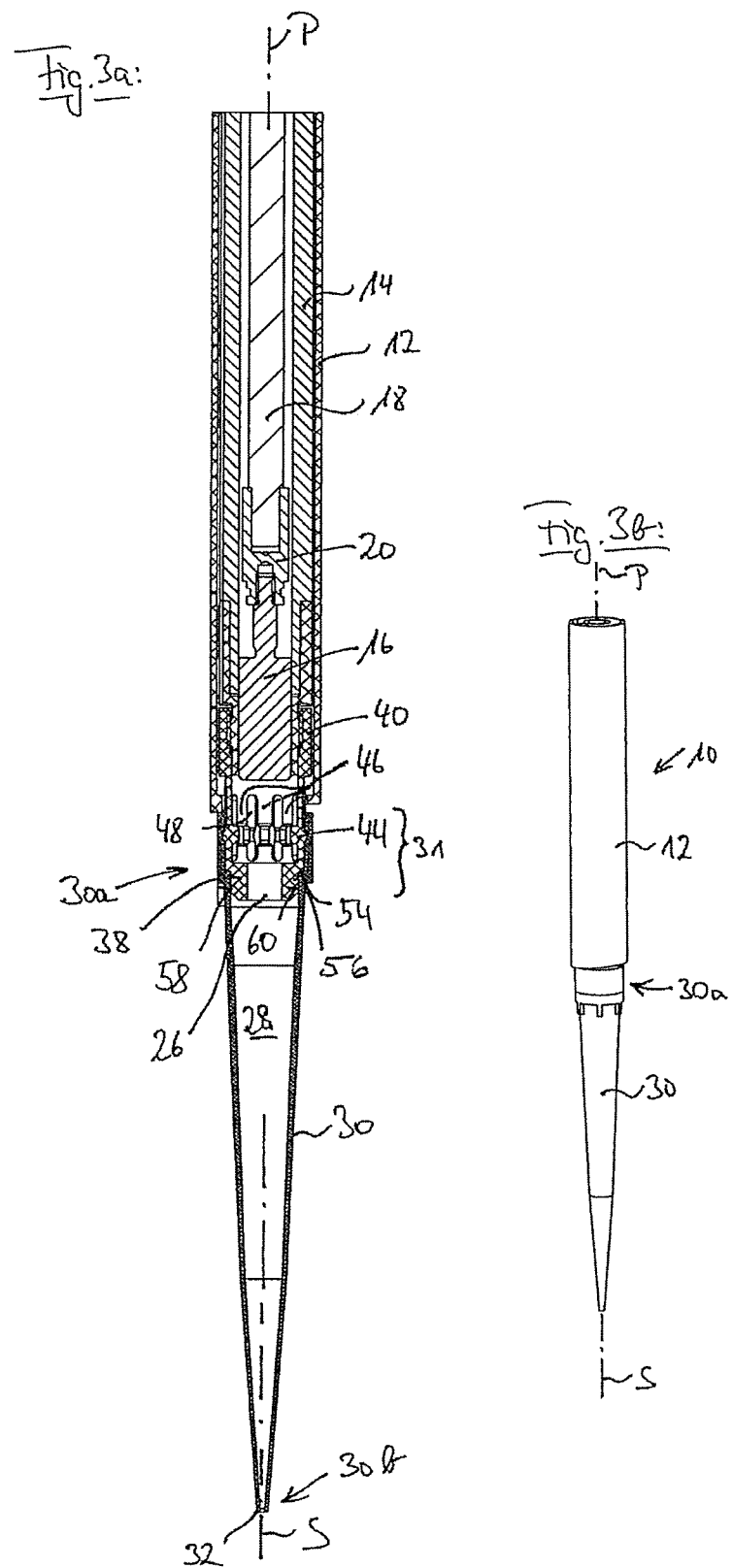

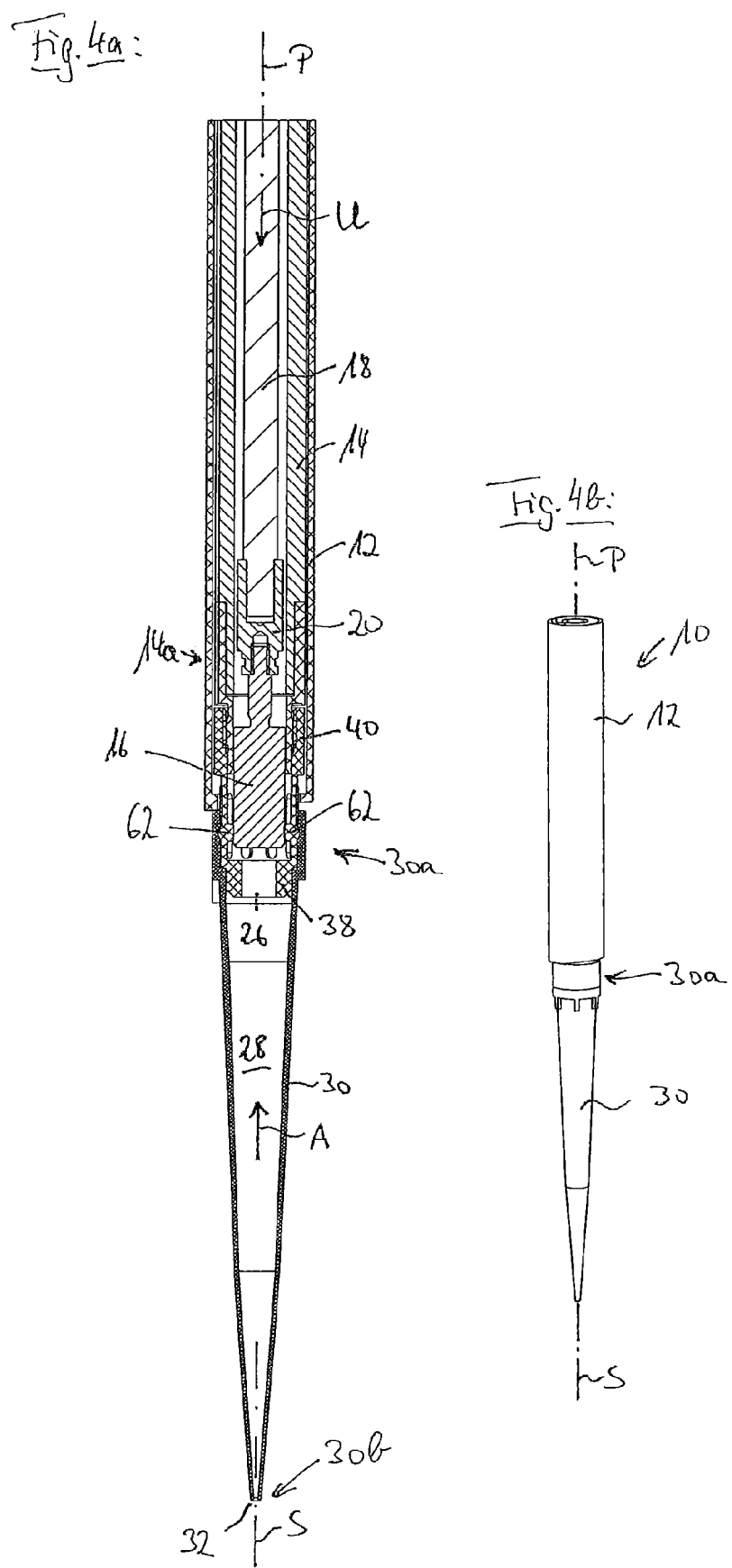

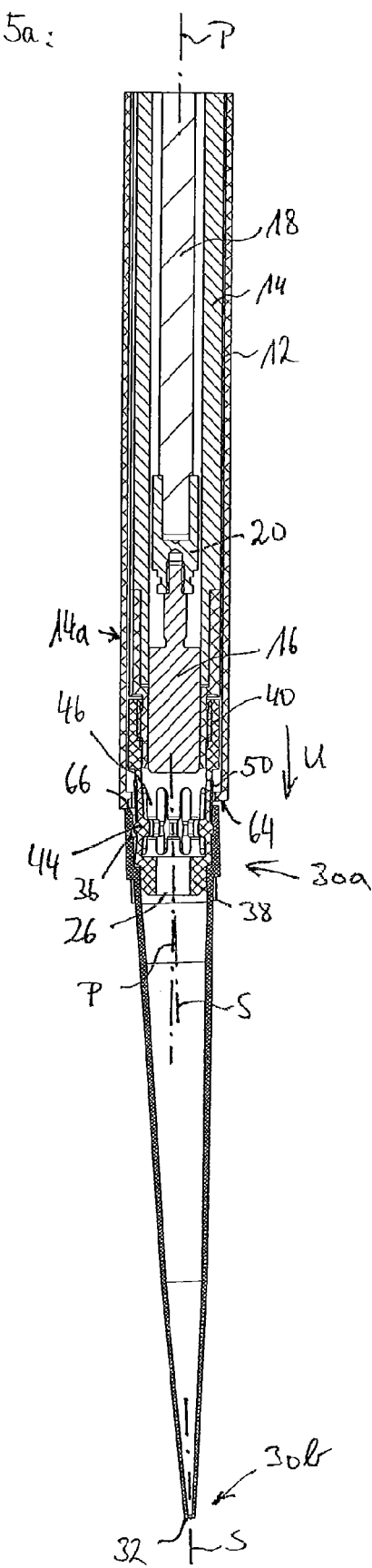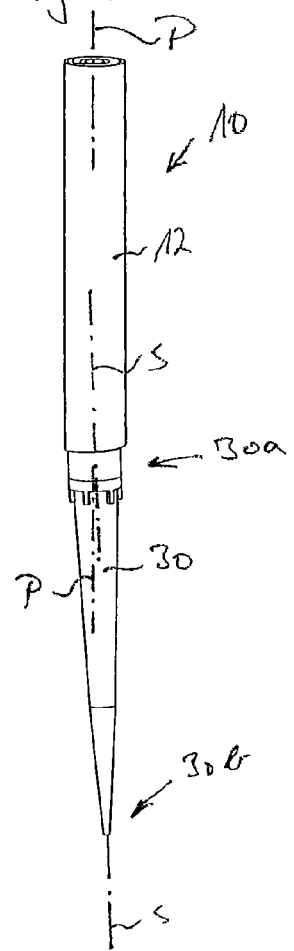

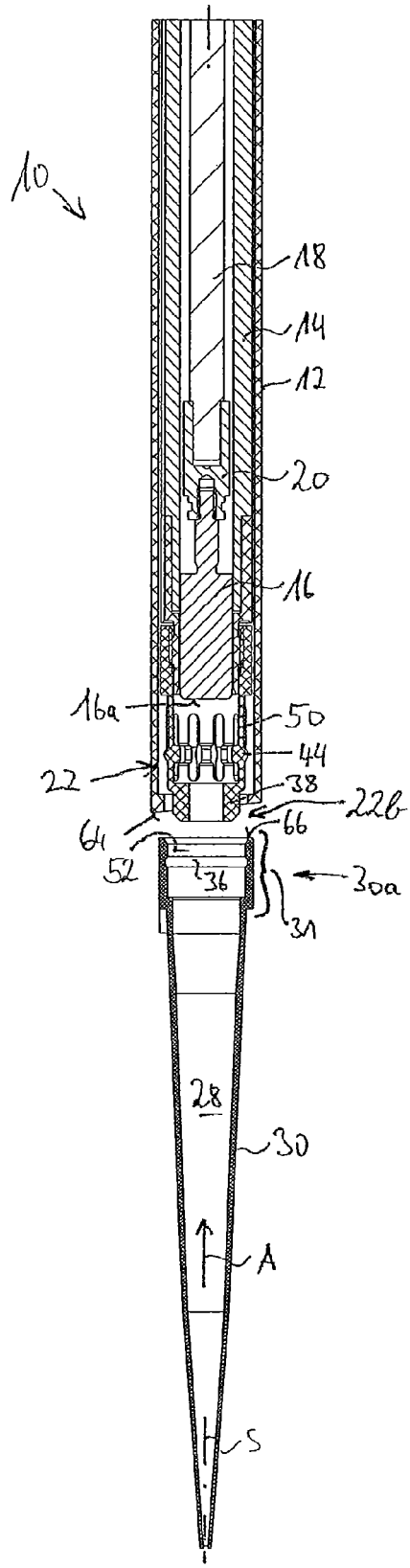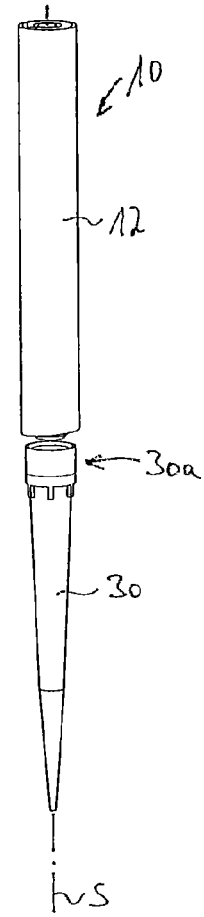

COUPLING FORMATION OF A PIPETTING CHANNEL OF A PIPETTING DEVICE FOR COUPLING OF A PIPETTE TIP THERETO

CROSS REFERENCE TO RELATED APPLICATION

This application is a 35 U.S.C. 371 National Phase Entry Application from PCT/EP2013/065485, filed Jul. 23, 2013, which claims the benefit of German Patent Application No. 10 2012 213 089.6 filed on Jul. 25, 2012, the disclosures of which are incorporated herein in their entirety by reference.

BACKGROUND OF THE INVENTION

Field of the Invention

The present invention relates to a coupling formation of a pipetting channel of a pipetting device for coupling of an implement, such as for example a pipette tip or a laboratory instrument, laboratory tool and the like. The coupling formation here surrounds a pipetting channel section which extends along a pipetting channel axis defining an axial direction, wherein the coupling formation further includes a pressure-imparting orifice on its free longitudinal end, into which the pipetting channel section opens, and wherein the coupling formation includes, at its surface which is radially external with respect to the pipetting channel axis and which surrounds the pipetting channel axis, and extending primarily in the axial and in the circumferential direction about the pipetting channel axis, a coupling projection yielding in the radial direction.

Background of the Related Art

Such a coupling formation having a pipette tip as an implement coupleable thereon is known, for example, from DE 199 17 375 A1.

Via the pressure-imparting orifice, using a pressure changing device, such as a pump or a piston-cylinder assembly, a changed pressure in the pipetting channel of a working fluid for aspiration and/or dispensing of a metering fluid can be transferred by a pipette opening of a coupled pipette tip into the metering space surrounded by the pipette tip.

In the known coupling formation, an elastomer ring deformable by a ferrule rests on a support which is formed to be immersed into a coupling opening of a pipette tip.

The ferrule is moveable along the pipetting channel axis relative to the support of the O-ring, so that the O-ring is can be squeezed between the ferrule and the support. In this case the O-ring surrounds the pipetting channel axis. A primary axial compression then initially results if the ferrule for squeezing the O-ring in the axial direction is moved towards the support, and as a consequence thereof there is a radial expansion of the O-ring—always with respect to the pipetting channel axis—so that after the squeezing process the O-ring has a larger outer diameter than in a mechanically unloaded state. In the squeezed state the radially expanded O-ring provides a coupling projection on its radially outer edge.

Implements adapted to the known coupling formation, in particular pipette tips, therefore usually include a retaining opening, circulating around the longitudinal axis of the coupling section, in a coupling opening on their, usually, axial coupling longitudinal ends—with respect to a longitudinal axis of a coupling section of the implement, which coincides with the pipetting channel axis in a state of being coupled to the pipetting device, in which retaining opening the squeezed and thereby radially expanded O-ring engages in the coupled state and thereby holds the implement with both friction-fit and positive locking on the coupling formation. The position and shape of the retaining opening circulating in the coupling section of the implement is chosen here such that the radially expanded O-ring of the coupling formation comes to abutment on an inclined surface section of the retaining opening such that the coupling section of the implement, in particular of the pipette tip, is not only held with positive locking by the radially expanded O-ring on the coupling formation, but is pretensioned in a mounting direction in which the coupling section is to be mounted on the coupling formation for coupling onto the pipetting device.

Due to this possibility of pretensioning the implement or its coupling section in the mounting direction by the squashed O-ring, corresponding abutment and counterabutment surfaces can be brought into abutting engagement and held securely in this state on the coupling formation and the coupling opening of the implement, whereby a relative orientation of the implement coupled to the pipetting device or its coupling section relative to the pipetting device is achieved and thus a correct seat of the pipette tip on the pipetting device can be ensured in the coupled state.

Due to a slip-off sleeve formed separately from the ferrule and also axially movable relative to the support, the implement can be slipped off of the known coupling formation and thus released.

The known coupling formation has proven itself in the market and delivers excellent results, in particular an excellent repeatable, secure coupleability of pipette tips and other implements on the coupling formation.

SUMMARY OF THE INVENTION

Proceeding from the known coupling formation discussed above, it is the object of the present invention to further develop the above-mentioned coupling formation such that it can be provided with a less-complex design, without appreciably sacrificing coupling security and coupling quality between coupling formation and an associated implement.

This object is inventively achieved by a coupling formation of the above-described type, wherein the coupling projection is provided substantially undeformable but radially displaceable on a spring assembly which is elastic in the radial direction.

Thus while in the prior art the resilience of the coupling projection in the radial direction is ensured by the material elasticity of the O-ring and its deformability, in the present invention the coupling projection is provided substantially undeformable, but radially displaceable on the coupling formation. In order to ensure the displacement ability, a spring assembly is provided on the coupling formation which is elastic in the radial direction. Thus while the O-ring known from the prior art only temporarily, under certain circumstances, has the coupling projection in its squashed state or in any case has the coupling projection in the squashed state to a greater degree than in the relaxed state, in the coupling formation of the present invention the coupling projection is always present, in a time-independent manner, to the same degree and is only radially displaced.

Using the inventive solution, the required, relatively movable ferrule known in the prior art can be omitted. Instead, the coupling projection—in contrast to the prior art, where it is only formed or strengthened by deforming a component—is always present and interacts with a spring assembly which is elastic in the radial direction and is thus formed for exerting a force in the radial direction. In this way it is possible to form the coupling projection as a type of locking projection, on which a pipette tip is mountable, and which, with a mounted coupling section of an implement, shifts into a locking engagement position driven by the force of the spring assembly.

With suitable dimensioning of the coupling formation and of the coupling projection provided thereon, the pipette tips formed for coupling on coupling formations of the prior art and other implements can also be coupled, structurally unchanged, onto the inventive coupling formation. For this purpose it is only necessary that the coupling projection of the inventive coupling formation have a predetermined distance, as a rule an axial distance, with respect to an abutment surface advantageously provided on the coupling formation, which is itself in abutting engagement with corresponding counterabutment surfaces of a coupled coupling section of an implement, in particular a pipette tip.

In the context of the present invention, an implement can be any implement coupled onto the pipetting device. A pipette tip is principally thought of as implement, which in the state wherein it is coupled to the pipetting device an aspiration and dispensing of liquids is permitted in a known manner using a pressure change of a working fluid differing from the liquid to be metered. In contrast, however, another laboratory instrument or a laboratory tool, such as a handling tool for transporting laboratory products can be coupled onto a pipetting device. Such a handling tool can be, for example, so-called "microtitre plates." Like the above-mentioned pipette tips, these laboratory instruments are also coupleable to the coupling formation presented here using suitably formed coupling openings for coupling to the coupling formation. When in the following the coupling of the coupling formation in conjunction with an implement coupled thereon is explained in the example of a pipette tip as the implement, it should not be forgotten that instead of the pipette tip, another laboratory instrument having suitable coupling openings can be coupled to the coupling formation presented here in the same manner as is the case for the pipette tip.

If it is not specified otherwise in the present application, the directions "axial," "radial," and "in the circumferential direction" indicate directions with respect to the pipetting channel axis. If a coupling state is mentioned wherein an implement, in particular a pipette tip, having the inventive coupling formation is coupled, then it should be assumed, if not stated otherwise, that the pipetting channel axis coincides with a longitudinal axis of the pipette tip or generally with a longitudinal axis of a coupling section of an implement.

A passive locking of a coupling longitudinal end or of a coupling section of a pipette tip, or generally an implement, on the inventive coupling formation for coupling itself to the pipetting device can occur without further operation of a separate device, such as, for example, the squashing device known from the prior art, such that the initially externally unloaded coupling projection is displaceable against the elastic force of the spring assembly by a radial force directed radially inward towards the pipetting channel axis. The elastic force of the spring arrangement thus pretensions the coupling projection radially outward. A coupling section of the implement, in particular of the pipette tip, said coupling section includes the coupling orifice can thus be mounted radially outward on the coupling formation of the present invention in a manner known from the prior art, and here initially displace the coupling projection radially inward against the elastic force of the spring assembly until the implement reaches a position relative to the coupling formation wherein a retaining opening in the coupling section of the implement, said retaining opening for positive locking engagement with the coupling section is positioned such that the elastic force of the spring arrangement displaces the coupling projection radially outward into the retaining opening to produce a locking engagement with the coupling section.

In a free state of the coupling formation unoccupied by a coupling section of an implement, the radial extension of the coupling projection of the pipetting channel axis can preferably be greater than when an implement is coupled on the coupling formation, so that in the case of a coupling of an implement the spring assembly can pretension the coupling projection with elastic force radially outward to the coupling section of the implement.

To facilitate a coupling of an implement to the coupling formation and to be able to generate a uniform as possible coupling force by the spring assembly in the circumferential direction about the pipetting channel axis, it is preferably provided that the coupling projection circulates around the pipetting channel axis. As a result, during the coupling of the implement to the coupling formation, its orientation in the circumferential direction about the pipetting channel axis is not relevant.

In principle, any spring assemblies can be used as the above-mentioned spring assembly providing the elastic force. For example, a helical compression spring having a radial spring axis—relative to the pipetting channel axis—can be disposed in the coupling formation. A plurality of such helical compression springs can be provided around the pipetting channel axis, in order to be able to provide an elastic force which is as uniform as possible in the circumferential direction. This at least one helical compression spring, and in the case of a plurality of springs, each spring, can pretension radially outward a coupling projection formed separately from the spring, such as based on the model of a ball catch.

However, this above-mentioned alternative embodiment is very expensive to assemble and requires a large number of components. It is therefore advantageous if at least one leaf spring assembly is provided on the coupling formation as the spring assembly. Leaf springs are geometrically simple components which can be provided on the coupling formation with a low manufacturing- and/or assembly-expense.

To prevent the radial dimension of the coupling formation from increasing undesirably due to the use of the spring assembly, the at least one leaf spring assembly is preferably provided in the coupling formation such that one end of the leaf spring assembly is located farther away in the axial direction from the pressure-imparting orifice, and that its opposing end is closer in the axial direction to the pressure-imparting orifice. The at least one leaf spring assembly preferably extends parallel to the pipetting channel axis. In this way not only a coupling formation having radially small dimensions can be ensured, but also an exclusively as possible radial force effect of the at least one leaf spring assembly and/or as exclusive as possible a radial stroke of the coupling projection.

In principle it is possible to allow the leaf spring to overhang one-side from the coupling formation, so that only one end of the axial end farthest from the pressure-imparting orifice and the axial end nearest the pressure-imparting orifice is thus fixedly connected to the coupling formation and the respective other opposing longitudinal end can interact with the coupling projection in a force-transferring manner.

However, a greatest possible stability of the coupling formation proposed here can be achieved if the at least one leaf spring assembly is fixedly connected on its axial end nearest the pressure-imparting orifice of the coupling formation and if the leaf spring assembly is fixedly connected on its axial end farthest from the pressure-imparting orifice to a channel-side section of the coupling formation. In this case the leaf spring assembly is thus advantageously fixedly clamped on the coupling formation on both of its longitudinal ends, so that the location of the transmission of elastic force of the at least one leaf spring assembly to the coupling projection is located between the axial ends of the at least one leaf spring assembly. This design not only contributes to an increased stability and durability of the coupling formation, which must bear a changing load of the at least one leaf spring assembly with each implement change, but also provides in turn for a small dimension in the radial direction of the coupling formation.

In principle it can be sufficient to provide a single coupling projection on the coupling formation, although this is not preferred since then an elastic force exerted by the spring assembly acts as coupling force in the circumferential direction on the pipette tip with locally different strengths. In order to be able to advantageously obtain a uniform-as-possible exertion of the coupling force in the circumferential direction by the coupling projection on a coupling section of an implement, it can advantageously be provided that the coupling projection is divided into a plurality of partial coupling projections, of which each is provided on a spring assembly which is elastic in the radial direction. Particularly if the elastic spring assembly is formed as at least one leaf spring assembly, each partial coupling projection can cooperate with its own associated leaf spring assembly or even can be provided thereon.

It is of course possible here that a plurality of partial coupling projections are provided on a leaf spring assembly In order to be able to ensure as uniform as possible an exertion of spring force by a leaf spring assembly on a partial coupling projection over the entire coupling formation, in particular around the entire circumference of the pipetting channel axis, it can also be provided that the coupling formation includes a plurality of preferably parallel leaf spring assemblies, of which each includes a partial coupling projection.

The leaf spring assemblies are preferably parallel to one another, which can be facilitated by the leaf spring assemblies, as indicated above, being aligned parallel to the pipetting channel axis. Due to the parallel arrangement of the leaf spring assemblies a uniform as possible force effect of the leaf spring assemblies on the associated partial coupling projections and/or on associated coupled coupling sections of implements can be achieved.

In order to provide sufficient mobility of the leaf spring assemblies in the radial direction and also to keep low the weight of the coupling formation for pipetting, transporting, or other processing, i.e. for accelerating and decelerating, according to a further development of the present invention it can be provided that two leaf spring assemblies directly adjacent in the circumferential direction have a circumferential gap between them and thus are disposed at a distance to each other in the circumferential direction. The arrangement of two leaf spring assemblies directly adjacent in the circumferential direction such that these are divided from each other by a circumferential gap preferably applies to all leaf spring assemblies adjacent in the circumferential direction, i.e. lying in the same axial section, of a coupling formation.

In principle, the above-described and further-developed coupling formation can be built from a plurality of components, such as from the end section, the at least one spring assembly and the channel side section. Often, however, at least a large part of the coupling formation, in particular the above-mentioned sections: end section and channel-side section, are manufactured from plastic, for example by injection molding. In this case, but also in other cases preferred due to a substantial simplification of assembly, it can be provided that the spring assembly, in particular the at least one leaf spring assembly, can be formed one-piece with the end section and/or the channel-side section of the coupling formation.

Alternatively or additionally, at least one partial coupling projection can be formed one piece with the leaf spring assembly respectively carrying it to reduce the assembly work for manufacturing the coupling formation. Preferably a plurality of partial coupling projections, even more preferably all partial coupling projections, are formed one-piece with their respective carrying leaf spring assembly, so that if partial coupling projections, leaf spring assemblies, end section and channel-side section of the coupling formation are formed one-piece, a coupling formation can be cast, without additional substantial assembly effort, nearly ready for operation from a manufacturing device, for instance an injection-molding device.

Furthermore, in order to be able to ensure, using a pipetting device provided with a coupling formation proposed here, the correct position of a coupling section of an implement, said coupling section is coupled onto the coupling formation and thus onto the pipetting device, according to an advantageous further development of the coupling formation discussed here it can be provided that on an end section of the coupling formation, said end section includes the pressure-imparting orifice, a position-securing formation is provided for securing the positioning relative to the coupling formation of a coupling section of an implement, said coupling section is coupled to the coupling formation.

The position-securing formation can interact with a corresponding counterformation on the coupling section of an implement during the coupling process—i.e. as a rule during mounting of a pipette tip on the coupling formation such that it radially surrounds the latter—such that during coupling on the coupling formation, the coupling section is guided into a desired end position.

For example, it can be constructively provided for this purpose that the position-securing formation includes a radial shoulder and/or a cylindrical section extending along the pipetting channel axis and/or a conical surface. All of the mentioned embodiments of a position-securing formation can interact with a corresponding counterformation on the side of the implement for guiding the coupling section of the implement into a desired position during coupling.

For example, the radial shoulder can define an axial end position of the implement. The cylindrical section can ensure a desired relative radial position of the implement relative to the pipetting channel axis, as a rule, such that a longitudinal axis of a coupling longitudinal end of a coupling section, in particular of a pipette tip longitudinal axis, coincides with the pipetting channel axis.

A conical surface can define both an axial and a radial end position of the implement relative to the coupling formation and relative to the pipetting channel axis, or can, in addition to the two above-mentioned designs of a position-securing formation, provide a sealing surface, using which, for instance, an interior volume of the pipette tip is sealed at the coupling location with respect to the external environment.

The tightness of a pipette volume enclosed by a pipette tip with respect to the external environment at the coupling formation is crucial for the functional capability of a pipetting device working with the pipette tip. Finally, the application-required pipette opening provided in the pipette tip should be the only opening in the pipetting-device-coupled state of the pipetting channel of the pipetting device through which to aspirate and dispense fluid, said pipetting channel is extended by the coupled pipette tip.

In order to provide this tightness at the coupling-side longitudinal end of the pipette tip independent of the specific design of the pipette tip, it can further be provided that the coupling formation includes a seal ring circulating around the coupling formation, which is formed to seal a pipette volume in the interior of the pipette tip at a coupling section of the pipette tip against the external environment in a gas-tight manner in a coupling state with the pipette tip coupled onto the coupling formation.

The seal ring is preferably manufactured from a material or includes a material at least on its application-specific surface facing towards the pipette tip which has a lower material stiffness than the material at least of the coupling projection. This means that with the same initial shape and the same force effect, the material of the seal ring advantageously deforms more strongly than that of the coupling projection or even also of the end section including the pressure-imparting orifice and of the channel-side section. Due to this easier deformability the seal ring can, at least on its surface facing towards the pipette tip, deformingly adapt to a section of the pipette tip, even with low axial contact pressure, and thus seal the pipette volume at the coupling formation. For different geometric embodiments of the coupling section of a pipette tip this is simplified further such that the seal ring is formed advantageously towards the pressure-imparting orifice, at least in an axial section. Then in practice the seal ring can be formed with a, preferably circulating, insertion slope, in particular with an insertion cone.

Furthermore the coupling projection can then advantageously particularly simply exert an axial force on the pipette tip, pretensioning the pipette tip in the axial direction towards the seal ring, if the seal ring is disposed farther away from the free longitudinal end of the coupling formation than the coupling projection. A pretensioning force acting in the axial mounting direction can, for example, be achieved such that an abutment surface of at least one formation of coupling projection and pipette-tip-side locking opening has an inclination with respect to the pipette tip axis. If it then turns out that the coupling projection and locking opening are in abutting engagement on each other, an initially radially acting spring force can be transposed by the system into an axial clamping force on the inclined abutment surface. The incline can also be achieved by an appropriate curvature of the abutment surfaces of coupling projection and/or locking opening.

The present invention further relates to a pipetting device including a coupling formation as described and further developed above.

In order to ensure that, after a coupling process of an implement onto the coupling formation, the coupling projection or the partial coupling projections can be positioned completely radially outward and the implement is thus securely coupled onto the coupling formation, it can be provided that the pipetting device includes a pipette piston, which, at last on its longitudinal end nearest the pressure-imparting orifice is dimensioned such that and movably received on the pipetting device in the pipetting channel such that it is both axially introducible so far into the pipetting channel section of the coupling assembly, and retractable again therefrom, that its longitudinal end nearest the pressure-imparting orifice lies closer to the pressure-imparting orifice than the coupling projection.

Thus the piston can penetrate axially so far into the coupling formation that the piston can displace the coupling projection or the partial coupling projections radially outward if the coupling projection was not already sufficiently displaced radially outward by the spring assembly.

Due to the possibility of the displacing of the pipette piston in the axial region of the coupling projection or of the partial coupling projections, a movement of the coupling projection or of the partial coupling projections radially inward can also be blocked by the pipette piston, so that an unintentional release of an implement coupled to the coupling formation can be made more difficult or even impossible. This is particularly advantageous for implements which have a large weight compared to a pipette tip, which can promote a loosening of the coupling engagement.

In order to be able to prevent to an even greater degree an unintentional releasing, especially of implements which are massive in comparison to pipette tips, it is also possible to couple one and the same implement via a plurality of implement-side coupling sections to an equally large number of pipetting-device-side coupling formations. In this way the load is distributed among a plurality of coupling formations and is thus reduced in magnitude for each individual coupling formation involved in the coupling. For example, adjacent pipetting, channels of a pipetting device, in particular of a pipetting robot, can be used as grippers for gripping and transporting implements, such as, for example, the above-mentioned "microtitre plates," in this case a formation of such a gripper by exactly two adjacent pipetting channels can already suffice.

Furthermore the pipetting device can have an axially movable slip-off device for releasing an implement coupled to it or to its coupling formation.

Such slip-off devices are usually formed to produce an abutting engagement via an abutment surface with a counterabutment surface of a coupling section of an implement, said coupling section is coupled to a coupling formation, during an axial slipping-off movement. If the slipping-off movement is continued after producing of the abutting engagement, the implement is thus slipped off of the coupling formation and thus decoupled from the pipetting device.

In the case of the coupling formation according to DE 199 17 375 A1 from the prior art, prior to the slipping off the coupling force can be considerably reduced by expansion of the O-ring which was squashed prior to the coupling, so that only a small force is required for decoupling the pipette tip shown there from the pipetting device.

With the presently discussed coupling formation, in the preferred case there is a surmountable locking of the coupling formation by the coupling projection using the coupling section of an implement, said coupling section is coupled thereon. This can only be overcome by sufficient exertion of force on the coupling section in the axial direction. As a rule the coupling section, and with it the associated implement, are moveable exclusively in the axial direction in the coupled state of the coupling formation.

Here it has proven to be advantageous for overcoming such a locking engagement to introduce an axial force only locally at a predetermined force introduction point and not simultaneously over the entire circumference of the coupling section around the pipetting channel axis.

This can be structurally achieved if the abutment surface of the slip-off device is inclined and/or curved with respect to the axial movement components of the slipping-off movement.

BRIEF DESCRIPTION OF THE DRAWING FIGURES

The present invention will be explained below with reference to the accompanying Figures. We have:

FIG. 1a depicts a longitudinal section through a pipetting channel including an inventive embodiment of a coupling formation and including a pipette tip as an implement prepared for coupling thereon, FIG. 1b depicts the assembly of FIG. 1a in perspective illustration, FIGS. 2a and 2b depict the pipetting channel and the pipette tip of FIGS. 1a and 1b during a coupling of the pipette tip onto the coupling formation, FIGS. 3a and 3b depict pipetting channel and pipette tip of FIGS. 1a to 2b in the state of a pipette tip coupled onto the coupling formation, FIGS. 4a and 4b depict pipetting channel and pipette tip of FIGS. 3a and 3b with lowered pipetting piston, FIGS. 5a and 5b depict pipetting channel and pipette tip of FIGS. 3a and 3b shortly after the start of a slipping-off process for releasing the pipette tip coupled onto the coupling formation, and FIGS. 6a and 6b depict pipetting channel and pipette tip of FIG. 1a to 5b with pipette tip slipped off the coupling formation and thus fully released.

DETAILED DESCRIPTION OF THE PREFERRED EMBODIMENTS

In FIGS. 1a to 6b a pipetting channel is generally designated by 10. The pipetting channel 10 extends along a pipetting channel axis P, which preferably passes centrally through the pipetting channel.

The pipetting channel 10 can include, for example completely radially outside with respect to the pipetting channel axis F, a slip-off sleeve 12 movable in the axial direction, which can be drivable for movement starting from the pulled-back position shown in FIG. 1a in the direction of the arrow U.

The pipetting channel 10 can further include, for example lying further radially inside with respect to the slip-off sleeve 12, a cylinder 14 wherein a piston 16 for changing a volume and thus a pressure of a working fluid can be movably accommodated axially below the piston 16 in the axial direction in FIG. 1a. For this purpose the piston 16 can be connected to an axially movable piston rod 18, for instance by interposition of a connecting element 20.

On its longitudinal end 10a lying closer to the piston surface 16a effective for changing the working fluid pressure, the pipetting channel 10 can have a coupling formation 22 which can be connected to the cylinder 14, for example via a connecting member 24.

For example, the connecting member 24 can be mounted on a connecting end 14a of the cylinder 14 and optionally additionally adhered thereto. A connecting longitudinal end 22a of the coupling formation 22 can in turn be screwed or clipped onto the connecting member 24. Alternatively or additionally the connecting longitudinal end 22a can be adhered, welded, or otherwise permanently connected to the connecting member.

Preferably the connecting points of the coupling formation 22 to the connecting member 24 and of the connecting member 24 to the cylinder 14 are located radially inside the slip-off sleeve 12 and are surrounded thereby and shielded from external influences.

On its free longitudinal end 22b the coupling formation 22 has a pressure imparting orifice 26 through which a working fluid pressure prevailing directly below the piston surface 16a is transferable into a metering space 28 of a pipette tip 30 coupleable to the coupling formation 22. Here the pipette tip 30 is only an exemplary embodiment of a general implement, instead of the pipette tip 30, another laboratory instrument, for instance a wire tool, such as a "microtitre plate" can be coupleable to the coupling formation 22.

The pressure-imparting orifice 26 is formed in an end section 38 which is assignable to the free longitudinal end 22b of the coupling formation.

The pipette tip 30 includes, in a known manner, a coupling longitudinal end 30a and a metering longitudinal end 30b. The coupling longitudinal end 30a is formed with a coupling section 31 for coupling onto the free longitudinal end 22b of the coupling formation 22, while the metering longitudinal end 30b includes a pipette opening 32 (see, for instance, FIG. 3a) through which a liquid can be aspirated into the metering space 28 of the pipette tip 30 by a pressure change of the working fluid, and is dispensible therefrom.

The coupling longitudinal end 30a of the pipette tip 30 is formed in a known manner such that the coupling formation 22 is to be mounted thereon in mounting direction A, surrounding it radially outward. Here the free longitudinal end 22b of the coupling formation 22 can be inserted into coupling opening 34 of the pipette tip 30, said coupling opening 34 being formed in the coupling longitudinal end 30a, and locked there. For this purpose a retaining opening 36 circulating about a pipette tip axis S can be provided in the coupling opening 34 as a locking opening.

In the coupled state the pipetting channel axis P and the pipette tip axis S are usually collinear. For this reason, for the process of coupling to the coupling formation 22, the pipette tip 30 should already be oriented as much as possible with the pipette tip axis S as collinear as possible to the pipetting channel axis P.

With axial spacing from its end section 38 the coupling formation 22 can include a channel section 40 which is assignable to the connecting longitudinal end 22a of the coupling formation.

A spring assembly 42 can be disposed axially between the end section and the channel section 40 of the coupling formation 22, said spring assembly 42 interacts with a plurality of partial coupling projections 44 which are substantially undeformable but radially displaceable against the elastic spring force of the spring assembly 22. The totality of the partial coupling projections 44 forms a coupling protection in the sense of this application.

The spring assembly 42 advantageously comprises a plurality of leaf spring assemblies 46 which can be advantageously disposed in a space-saving manner extending parallel to the pipetting channel axis P. This means that their largest dimension extends parallel to the pipetting channel axis P as the longitudinal dimension.

In order to provide sufficient radial movement space for the leaf spring assemblies 46, a gap space 48 is preferably disposed between two leaf spring assemblies 46 which are directly adjacent in the circumferential direction, so that the leaf spring assemblies 46 are disposed in the circumferential direction with spacing from one another.

The leaf spring assemblies 46 are advantageously formed one-piece with the channel section 40 on their longitudinal end farthest from the pressure-imparting orifice 26. The leaf spring assemblies 46 can also be advantageously formed one-piece with the end section 38 on their longitudinal end closer to the pressure-imparting orifice 26.

Furthermore, the plurality of partial coupling projections 44 can advantageously be formed one-piece with the leaf spring assemblies 46 for the reduction of manufacturing and assembly expense, wherein there is preferably a 1:1 assignment such that exactly one partial coupling projection 44 is formed on each leaf spring assembly 46, and each partial coupling projection 44 interacts with exactly one leaf spring assembly 46 and is radially displaceable with respect to the pipetting channel axis P against the radial force of the leaf spring assembly 46.

Furthermore, the pipetting channel 10 can have a seal ring 50 which advantageously circulates completely around the pipetting channel axis, and surrounds the coupling formation 22 radially outward such that an abutment surface pointing radially outward can itself reach a corresponding counterabutment surface 52 in the coupling opening 34 when a pipette tip 30 is coupled to the coupling formation 22, in order to seal the coupling region between the coupling formation 22 and the pipette tip 30 to the external environment and prevent a loss of working fluid pressure due to a leakage there.

The seal ring 50 is preferably located axially farther from the pressure-imparting orifice 26 than the partial coupling projections 44, so that the latter are not impaired in their coupling action by the sealing abutment engagement of the seal ring 50 with the pipette tip 30.

The seal ring 50 can be manufactured from a material which with the same initial shape and the same mechanical loading deforms more strongly than the material of the coupling formation and/or the material of the pipette tip 30. The seal ring 50 can thus fill and close any gaps present between pipette tip and coupling formation 22 by deforming.

As depicted in the present example, the coupling formation 22 is preferably designed one-piece as an injection-molded part, wherein, if desired, a thread can be provided on the connecting longitudinal end, said thread can already be manufactured during injection molding, which, however, makes more difficult the demolding of the coupling formation from the injection mold, or said thread can subsequently be cut into the component.

A coupling process of the pipette tip 30 onto the coupling formation 22 is depicted in FIGS. 2a and 2b. An inner wall of the coupling opening 34, in particular the seal counterabutment surface 52 (see FIG. 1a) located axially over the retaining opening 36 presses the partial coupling projections 44 at the point in time depicted in FIGS. 2a and 2b against the spring force of the leaf spring assemblies 46 radially inward towards the pipetting channel axis so that the pipette tip 30 can be mounted onto the coupling formation 22 with its coupling-side longitudinal end 30a in the mounting direction A. Due to the radial displacement of the partial coupling projections 44 against the elastic force of the leaf spring assemblies 46, the force required for mounting or coupling of the pipette tip 30 onto the coupling formation 22 and thus onto the pipetting channel 10 is in fact increased, but coupling means which have been necessary up to now on the pipetting channel 10 are thereby avoided.

In FIGS. 3a and 3b, the pipette tip 30 is depicted completely on the coupling formation 22 and thus on the pipetting channel 10 in the coupled state. The partial coupling projections 44 advantageously located in a plane orthogonal to the pipetting channel axis P are driven by the elastic force of the leaf spring assemblies 46 into engagement in the retaining opening 36 and thus produce a positive locking coupling between the pipette tip 30 and the coupling formation 22. Depending on the material pairing at the point of coupling, i.e. on the material at the coupling formation 22 facing towards the pipette tip 30 and on the material at the coupling longitudinal end 30a of the pipette tip 30 facing radially inward towards the coupling formation 22, the positive locking coupling, which is preferably a surmountable locking, is strengthened by a friction-fit connection between the materials and components concerned.

As can be seen from FIG. 3a, in the fully coupled state a positioning abutment surface 54 lies in the axial direction, said positioning abutment surface 54 preferably continuously circulates about the pipetting axis P, on a corresponding positioning counterabutment surface 56 of the pipette tip 30 and thus defines the axial position of the pipette tip 30 relative to the coupling formation 22.

Both the positioning abutment surface 54 on the coupling formation 22 and the positioning counterabutment surface 56 on the pipette tip 30 are formed by radial shoulders in the example depicted, in the case of the coupling formation 22 by a radial shoulder between the end section 38 and the spring assembly 42.

Furthermore, an outer surface of the end section 38, said outer surface is preferably facing in the radial direction, is preferably in abutting engagement with a corresponding counterabutment surface 60 of the pipette tip 30, said counterabutment surface 60 is facing in the radial direction, in order to also align the pipette tip 30 in the radial direction with respect to the pipetting channel axis P.

The positive locking engagement of the partial coupling projections 44 into the receiving opening 36 is preferably designed such that a resulting pretension force acts on the pipette tip 30 which pretensions this in mounting direction A. In the example shown here, this can be achieved, for example, by the partial coupling projections 44 only abutting on a surface section of the concave receiving opening 36 located axially closer to the seal abutment surface 52 and facing towards the pipette longitudinal end 30b.

As can further be seen in FIG. 3a, in the fully coupled states shown there the seal abutment surface 52 abuts on the radially-outward-facing surface of the seal ring 50, so that the coupling point between coupling formation 22 and pipette tip 30 is sealed gas-tight. For this purpose the seal ring 50 advantageously extends in the axial direction over the axially longitudinal end of the gap 48 provided between the leaf spring assemblies 46 adjacent in the circumferential direction.

In FIG. 4a it is shown how by moving the pipette piston 16 towards the pressure-imparting orifice 26, the desired locking positioning of the partial coupling projections 44 can be verified, or even produced, with the pipette tip 30 coupled onto the coupling formation 22. According to a further advantageous embodiment of the present invention, it is sufficient if the piston 16 is lowered so far towards the pressure-imparting orifice 26 that its piston surface 16a is located closer to the pressure-imparting orifice 26 than the partial coupling projections 44. The partial coupling projections 44 preferably lie in an arrangement plane orthogonal to the pipetting channel axis P.

For the purpose of correct positioning of the partial coupling projections 44, these and/or the leaf spring assemblies 46 can have projections 62 pointing radially inward, which are dimensioned in the radial direction such that with correct positioning of the partial coupling projections 44 or the leaf spring assemblies 46 interacting therewith, the clearance between mutually opposing projections 62 corresponds to the outer dimension of the piston 16. Partial coupling projections 44 not displaced far enough outward radially by the piston 16 can thus be moved radially outward by the piston 16.

In FIGS. 5a and 5b the start of a slipping-off process is shown, whereby a pipette tip 30 coupled onto the coupling formation 22 discussed here, is releaseable again therefrom.

For this purpose the slip-off sleeve 12 is moved relative to the coupling formation 22 in the direction of the arrow U. The slip-off sleeve 12 has an abutment surface 64 facing towards the coupling formation 22 in the axial direction, whereby it achieves abutting engagement during slipping-off with a counterabutment surface 66 of the pipette tip 30, said counterabutment surface 66 facing towards the slip-off sleeve 12 in the axial direction.

It is advantageous here if the abutment surface 64 of the slip-off sleeve not orthogonal with respect to the pipetting channel axis P or with respect to the movement direction U, but rather is provided with a predetermined inclination with respect to a plane orthogonal to the pipetting channel axis P, while the counterabutment surface 66 of the pipette tip 30 in the coupled-on-the-coupling-formation-22 state is advantageously located in a plane orthogonal to the pipetting channel longitudinal axis P and to the pipette tip axis S collinear therewith.

In this way the force introduction of the axial slipping-off force required for overcoming the locking engagement produced by the partial coupling projections 44, the leaf spring assemblies 46 and the receiving opening 36 is not effected simultaneously over the full circumference of the counterabutment surface 66, but in the circumferential direction initially locally only at a point or in a circumferential region. In this way the locking engagement is initially released at this point, whereby the pipette tip axis S is placed into an oblique position with respect to the pipetting channel axis.

With continuation of the axial movement of the slip-off sleeve 12 in the direction of the arrow U, the rest of the abutment surface 64, which up to now is not yet in abutting engagement with the counterabutment surface 66, reaches engagement therewith, so that the locking engagement of the coupling formation 22 with the coupling longitudinal ends 30a of the pipette tip is also released in the remaining circumferential section.

Finally the pipette tip 30 is thus completely slipped off from the coupling formation 22, as shown in FIGS. 6a and 6b, wherein the slip-off sleeve 12 is depicted at its bottom dead point. If the slip-off sleeve 12 reaches this point, the pipette tip 30 falls completely away from the coupling formation 22 or is already fallen off therefrom.

Instead of the pipette tip 30 depicted here, any implement can be coupled onto the coupling formation 22 presented here or released again therefrom, provided the coupling section 31 of the implement formed for coupling with the coupling formation 22 is equipped with the required technical features presented for coupling with the coupling formation 22.

The invention claimed is:

1. A pipetting device comprising: a pipetting channel having a coupling formation for coupling of an implement, wherein the coupling formation surrounds a section of the pipetting channel which extends along a axis of the pipetting channel axis defining an axial direction, wherein the coupling formation further includes a pressure-imparting orifice on its a free longitudinal end of the coupling formation, into which the pipetting channel section opens and includes, at a surface which is radially external with respect to the pipetting channel axis and which surrounds the pipetting channel axis, and extending primarily in the axial and in a circumferential direction about the pipetting channel axis, a coupling projection yielding in the radial direction,
wherein the coupling projection is provided substantially undeformable but radially displaceable on a spring assembly which is elastic in the radial direction.

2. The pipetting device according to claim 1, wherein the unloaded coupling projection is radially displaceable against the elastic force of the spring assembly by a radial force directed radially inward toward the pipetting channel axis.

3. The pipetting device according to claim 1, wherein the coupling projection circulates completely about the pipetting channel axis.

4. The pipetting device according to claim 1, wherein the spring assembly comprises at least one leaf spring assembly which extends from an axial end far from the pressure-imparting orifice to an axial end close to the pressure-imparting orifice.

5. The pipetting device according to claim 4, wherein the at least one leaf spring assembly is fixedly connected on its axial end closer to the pressure-imparting orifice to an end section of the coupling formation, which end section includes the pressure-imparting orifice, and that the leaf spring assembly is fixedly connected on its axial end farther from the pressure-imparting orifice to a channel-side section of the coupling formation.

6. The pipetting device according to claim 5, wherein a position-securing formation for securing the positioning of a pipette tip coupled with the coupling formation relative to the coupling formation is provided on an end section of the coupling formation, which end section includes the pressure-imparting orifice.

7. The pipetting device according to claim 6, wherein the position-securing formation includes at least one of a radial shoulder and a cylindrical section, extending along at least one of the pipetting channel axis and a conical surface.

8. The pipetting device according to claim 1, wherein the coupling projection is divided into a plurality of partial coupling projections of which each is provided on a spring assembly, in particular a leaf spring assembly, which is elastic in the radial direction.

9. The pipetting device according to claim 8, wherein it includes a plurality of parallel leaf spring assemblies of which each includes a at least one partial coupling projection.

10. The pipetting device according to claim 9, wherein two leaf spring assemblies immediately adjacent in the circumferential direction have a circumferential gap between them and are thus disposed spaced from each other in the circumferential direction.

11. The pipetting device according to claim 9, wherein at least one of said at least one partial coupling projection, is formed one-piece with the respective carrying leaf spring assembly.

12. The pipetting device according to claim 9, wherein said at least one partial coupling projection includes a plurality of partial coupling projections that are formed one-piece with the respective carrying leaf spring assembly.

13. The pipetting device according to claim 9, wherein all partial coupling projections of said at least one partial coupling projection are formed one-piece with the respective carrying leaf spring assembly.

14. The pipetting device according to claim 1, further comprising a seal ring circulating around the coupling formation, which is formed to seal a pipette volume in the interior of the pipette tip on a coupling section of the pipette tip against the external environment in a coupling state with the pipette tip coupled on the coupling formation.

15. The pipetting device according to claim 14, wherein the seal ring is formed tapered towards the pressure-imparting orifice at least in an axial section.

16. The pipetting device according to claim 14, wherein the seal ring is disposed farther away from the free longitudinal end of the coupling formation than the coupling projection.

17. The pipetting device according to claim 1, wherein the spring assembly, the coupling projection, an end section of the coupling formation, which end section includes the pressure-imparting orifice, and a channel-side section of the coupling formation, which channel-side section is located farther away from the free longitudinal end of the coupling formation than the spring assembly, are formed one-piece.

18. The pipetting device according to claim 1, further including a pipetting channel of which the pipetting channel section of the coupling formation forms a section,
wherein the pipetting device includes a pipette piston which is dimensioned, at least on its longitudinal end nearest the pressure-imparting orifice, and is movably accommodated on the pipetting device in the pipetting channel such that it is introducible axially into the pipetting channel section of the coupling assembly and retractable again therefrom so far that its longitudinal end nearest the pressure-imparting orifice is closer to the pressure-imparting orifice than the coupling projection.

19. The pipetting device according to claim 18, wherein the pipetting device includes an axial slip-off device, which is formed to produce an abutting engagement during a slipping-off movement via an abutment surface with a counterabutment surface of an implement coupled with the coupling formation, for example a pipette tip or a laboratory instrument, laboratory tool and the like, in order to slip the pipette tip off of the coupling formation by continuing the slipping-off movement after producing of the abutting engagement, and thus decouple from the pipetting device,
wherein the abutment surface of the slip-off device is inclined or curved with respect to the axial movement direction of the slipping-off movement.

* * * * *